US 6,580,794 B1

(12) United States Patent
Ono

(10) Patent No.: US 6,580,794 B1
(45) Date of Patent: Jun. 17, 2003

(54) ACOUSTIC ECHO CANCELER WITH A PEAK IMPULSE RESPONSE DETECTOR

(75) Inventor: Yoshihiro Ono, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/374,650

(22) Filed: Aug. 13, 1999

(30) Foreign Application Priority Data

Aug. 14, 1998 (JP) .................................. 10-229812

(51) Int. Cl.⁷ .................................................. H04M 9/08
(52) U.S. Cl. .......................... 379/406.08; 379/406.01; 379/406.16
(58) Field of Search ................ 379/3, 390.04, 379/392, 392.01, 395.01, 399.01, 402, 404, 417

(56) References Cited

U.S. PATENT DOCUMENTS

| | | | | | |
|---|---|---|---|---|---|
| 4,736,414 | A | * | 4/1988 | Montagna et al. | 379/411 |
| 5,146,494 | A | * | 9/1992 | Harman | 379/411 |
| 5,539,731 | A | * | 7/1996 | Haneda et al. | 370/32.1 |
| 5,598,468 | A | * | 1/1997 | Ammicht et al. | 379/410 |
| 5,748,751 | A | * | 5/1998 | Janse et al. | 381/93 |
| 5,856,970 | A | * | 1/1999 | Gee et al. | 370/286 |
| 6,212,273 | B1 | * | 4/2001 | Hemkumar et al. | 379/410 |
| 6,236,725 | B1 | * | 5/2001 | Takada et al. | 379/406 |
| 6,282,286 | B1 | * | 8/2001 | Reesor et al. | 379/410 |
| 6,301,357 | B1 | * | 10/2001 | Romesburg | 379/406.06 |
| 6,351,532 | B1 | * | 2/2002 | Takada et al. | 379/406.01 |
| 6,385,176 | B1 | * | 5/2002 | Iyengar et al. | 370/286 |
| 6,434,110 | B1 | * | 8/2002 | Memkumar | 370/201 |
| 6,473,409 | B1 | * | 10/2002 | Malvar | 370/286 |

FOREIGN PATENT DOCUMENTS

| | | | |
|---|---|---|---|
| JP | 9-275366 | 10/1977 | |
| JP | 7-58673 | 3/1995 | |
| JP | 8-65213 | 3/1996 | |
| JP | 9-55687 | 2/1997 | |
| JP | 9-98115 | 4/1997 | |
| JP | 9-116471 | 5/1997 | |
| JP | 9-116613 | 5/1997 | |
| JP | 410161667 A | * 6/1998 | ......... G10K/15/00 |

* cited by examiner

Primary Examiner—Binh Tieu
(74) Attorney, Agent, or Firm—Dickstein, Shapiro, Morin & Oshinsky, LLP.

(57) ABSTRACT

In an acoustic echo canceler of a loudspeaking telephone apparatus, a sequence of successively delayed tap signals of a remote speech signal from a transmission line are respectively weighted by filter coefficients and summed together to produce an acoustic echo replica of the speech signal. The filter coefficients are updated with a residual echo and restricted to those which correspond to an echo component of the speech signal, or peak impulse response of the acoustic feedback path between the loudspeaker and the microphone. The tap signals are also restricted to those corresponding to the restricted filter coefficients. The output of the microphone is combined in a subtractor with the acoustic echo replica, producing the residual echo. After small amplitude components of the residual echo are suppressed in a first attenuator, the output of this attenuator is supplied through a second attenuator to the line. The magnitude of the restricted tap signals of the adaptive filter is compared with the output of the first attenuator. If the former is greater than the latter, the attenuation of the second attenuator is increased. Otherwise, the attenuation of the second attenuator is decreased.

6 Claims, 4 Drawing Sheets

ADAPTIVE FILTER

ACOUSTIC ECHO CANCELER WITH A PEAK IMPULSE RESPONSE DETECTOR

BACKGROUND OF THE INVENTION

1. Field of the Invention

The present invention relates generally to echo cancelers and more specifically to an acoustic echo canceler for loudspeaking telephones and the like for canceling acoustic echoes produced as a result of acoustic coupling between a loudspeaker and a microphone.

2. Description of the Related Art

Japanese Laid-Open Patent Specification 07-58673 discloses an acoustic echo canceler for loudspeaking telephones or teleconferencing systems. FIG. 1 illustrates a prior art digital acoustic echo canceler 102 incorporated in a loudspeaking telephone, which is connected via a hybrid circuit 101 to a telephone exchange line 100. Analog speech signal from the telephone line 100 is converted to a digital signal by an analog-to-digital converter 110 and applied to an adaptive filter 112 for producing a digital replica of an acoustic echo, or "pseudo-echo". The digital speech signal is also applied to a digital-to-analog converter 111 for driving a loudspeaker 104 with an analog speech signal amplified by an amplifier 103. The original sound signal is reconstructed by the loudspeaker 104 and part of the sound energy is coupled to a microphone 105, amplified by amplifier 106 and converted to digital form by an analog-to-digital converter 113. This talker's voice would be returned to the source as an echo. This echo signal is applied to a digital subtractor 114, where it is cancelled with the echo replica supplied from the adaptive filter 112.

Adaptive filter 112 includes an input buffer 120 which serves as a tapped delay line for the remote speech signal to produce a series of successively delayed digital tap signals. These tap signals are supplied to tap-gain multipliers 121 where they are weighted by respective tap-gain coefficients from tap-gain update circuits 123 and then summed together in an adder 122. Tapgain multipliers 121 and the adder 122 form a convolutional integrator. Each update circuit 123 includes a multiplier (correlator) 124, an adder 125 and a unit delay element 126. Multiplier 124 of each update circuit is used to detect the correlation between the corresponding tap signal and a residual echo which appears at the output of subtractor 114. Adder 125 provides summation of the correlation output of multiplier 124 with the output of the delay element 126 to produce a tap-gain coefficient.

Since the echo cancelling effect by the adaptive filter is not sufficient to completely remove the acoustic echo, the residual echo is detected by a level detector 115. A gain controller 116 is responsive to the detected level of the residual echo for controlling a gain adjustment circuit 117, which is interposed in the circuit coupling the output of subtractor 114 to the hybrid circuit 101 via a digital-to-analog converter 118. When the amplitude of the output of subtractor 114 is lower than some critical level, the level detector 115 directs the gain controller 116 to control the gain adjustment circuit 117 to reduce its gain, so that the acoustically coupled residual echo is prevented from returning to the talker.

However, one disadvantage of the prior art is that the amount of computations involved in the gain adjustment circuit 117 is substantial. Another disadvantage is that, since the gain adjustment is determined exclusively by the residual echo, the range of adjustment is still insufficient to cover large residual echoes.

SUMMARY OF THE INVENTION

It is therefore an object of the present invention to provide an acoustic echo canceler which does not require time-consuming, complex computations.

Another object of the present invention is to provide an acoustic echo canceler capable of canceling large residual echoes.

According to a first aspect, the present invention provides an acoustic echo canceler for a speech communication system including a loudspeaker and a microphone acoustically coupled with the louspeaker through a feedback path. The acoustic echo canceler comprises an adaptive filter including a tapped delay line for receiving a remote speech signal to produce a sequence of successively delayed tap signals and a convolutional integrator for respectively weighting the tap signals with filter coefficients and summing the weighted tap signals to produce an acoustic echo replica of the remote speech signal, the adaptive filter updating the filter coefficients with a residual echo and restricting the filter coefficients to those which correspond to an echo component of the remote speech signal and restricting the tap signals to those which correspond to the restricted filter coefficients. The output signal of the microphone is combined in a subtractor with the acoustic echo replica, producing the residual echo. An attenuator is provided for receiving an output signal of the subtractor. Comparator circuitry compares the output signal of the subtractor with the restricted tap signals of the adaptive filter for increasing the attenuation of the attenuator when the restricted tap signals are greater in magnitude than the output signal of the subtractor and decreasing the attenuation when the restricted tap signals are smaller in magnitude than the output signal of the subtractor.

According to a second aspect, the present invention provides an acoustic echo canceler for a speech communication system including a loudspeaker and a microphone acoustically coupled with the louspeaker through a feedback path. The acoustic echo canceler comprises an adaptive filter including a tapped delay line for receiving a remote speech signal to produce a sequence of successively delayed tap signals and a convolutional integrator for respectively weighting the tap signals with filter coefficients and summing the weighted tap signals to produce an acoustic echo replica of the remote speech signal, the adaptive filter updating the filter coefficients with a residual echo and restricting the filter coefficients to those which correspond to an echo component of the remote speech signal and restricting the tap signals to those which correspond to the restricted filter coefficients. The output signal of the microphone is combined in a subtractor with the acoustic echo replica, producing the residual echo. A first attenuator is provided for suppressing small amplitude components of the residual echo and a second attenuator receives the output signal of the first attenuator. Comparator circuitry compares the output signal of the first attenuator with the restricted tap signals of the adaptive filter for increasing the attenuation of the second attenuator when the restricted tap signals are greater in magnitude than the output signal of the first attenuator and decreasing the attenuation of the second attenuator when the restricted tap signals are smaller in magnitude than the output signal of the first attenuator

BRIEF DESCRIPTION OF THE DRAWINGS

The present invention will be described in further detail with reference to the accompanying drawings, in which.

DETAILED DESCRIPTION

Figure 1:
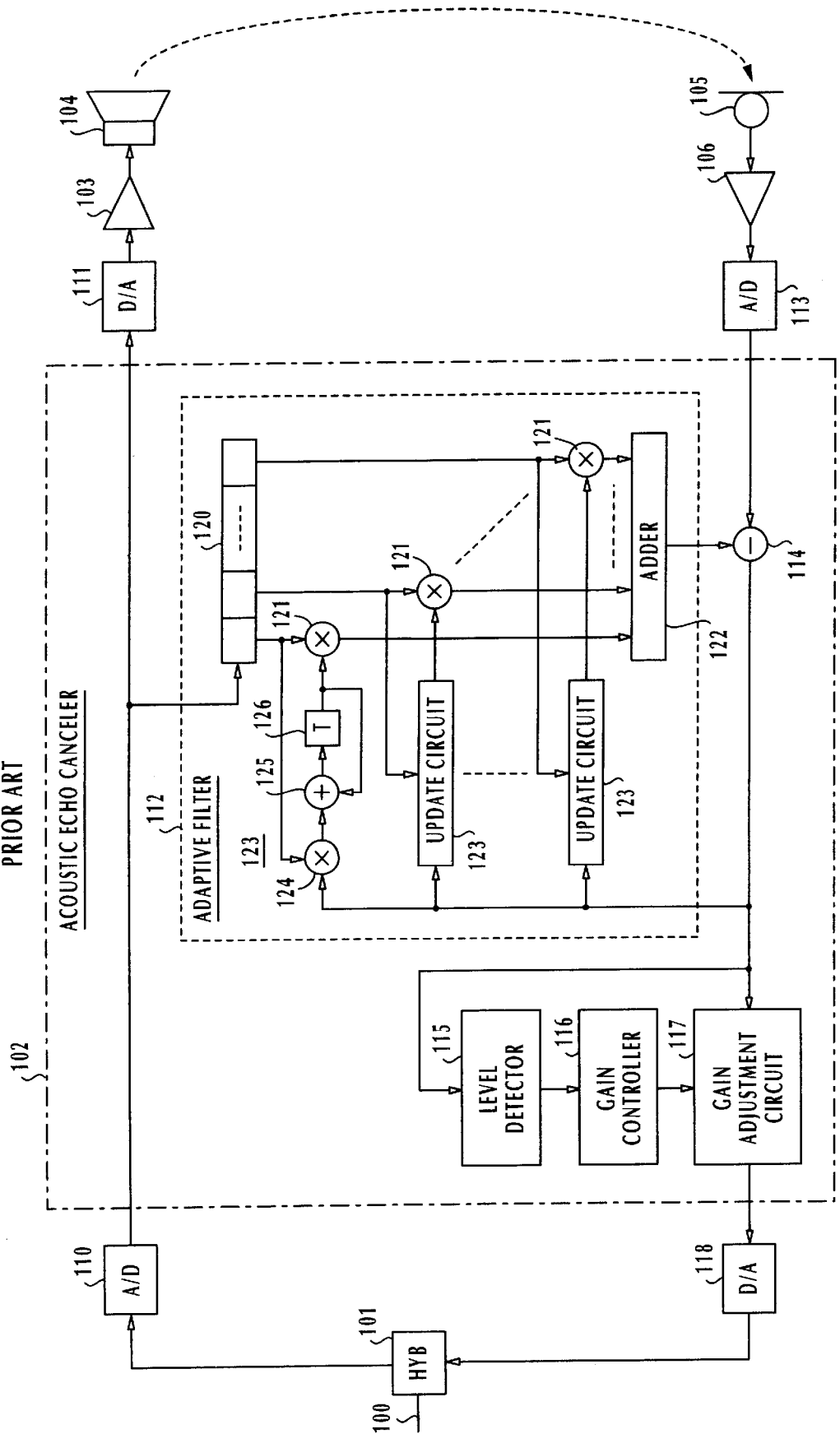
FIG. 1 is a block diagram of a prior art echo canceler.
Figure 2:
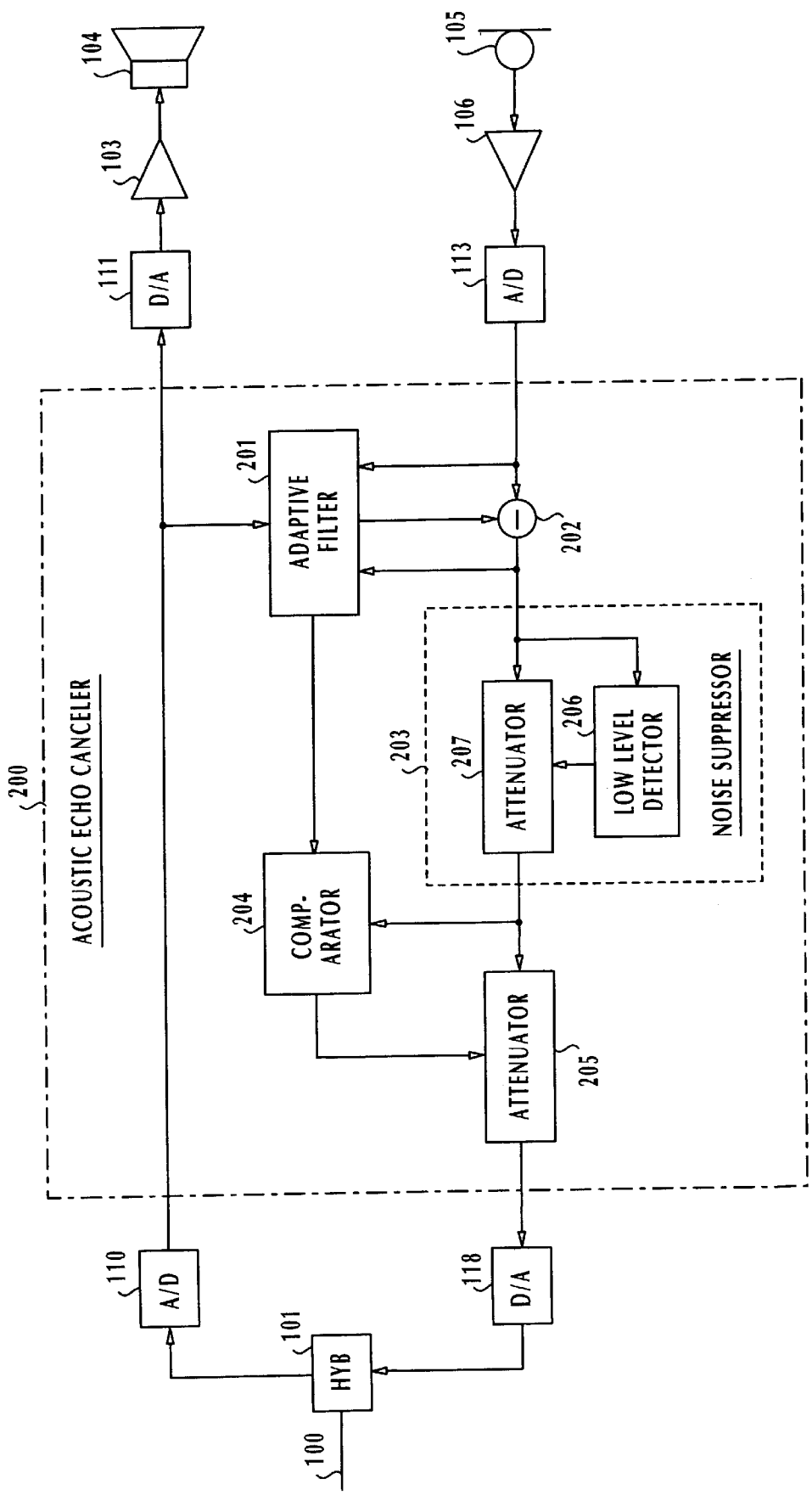
FIG. 2 is a block diagram the acoustic echo canceler of the present invention.

FIG. 2 shows a digital acoustic echo canceler for a loudspeaking telephone according to the present invention. The acoustic echo canceler, 200, includes an adaptive transversal filter 201 which receives the remote digital speech signal of the telephone from the A/D converter 110, the local digital speech signal of the telephone from the A/D converter 113 and a residual echo signal from a subtractor 202. Using the remote speech signal and the residual echo signal, the adaptive filter 201 adaptively estimates a replica of the echo of the remote speech signal which is produced at the microphone 105 as a result of its acoustic coupling with the loudspeaker 104. Subtractor 202 cancels the acoustically coupled component of the remote speech signal by combining the output of the A/D converter 113 with the echo replica.

The output of the subtractor 202 is applied as a residual echo to a noise suppressor 203, whose function is to estimate its small amplitude components, or noise by using a low level detector 206 and suppress the noise by controlling an attenuator 207 connected to the output of subtractor 202.

As will be described, the adaptive filter 201 further produces "restricted tap signals (or a portion of distant speech samples)" which correspond to the peak impulse response (transfer function) of the acoustic feedback path between the loudspeaker 104 and the microphone 105 and contributes to the generation of the acoustic echo. The restricted tap signals are supplied to a comparator 204 where their magnitude is compared with the output of the noise suppressor 203.

According to their relative values, the comparator 204 controls a second attenuator 205 that is interposed between the noise suppressor 203 and the D/A converter 118 to introduce a variable loss to the local speech signal. When the output of the noise suppressor 203 is lower than the restricted tap signals, it is determined that the signal from the noise suppressor 203 is a residual echo and the comparator 204 commands the attenuator 205 to increase its loss, so that the amplitude of the residual echo is further reduced. Conversely, when the output of the noise suppressor 203 is higher than the restricted tap signals, it is determined that the signal from the noise suppressor 203 is a local speech signal and the comparator 204 commands the attenuator 205 to decrease its loss for low-loss transmission of the local speech signal.

Figure 3:
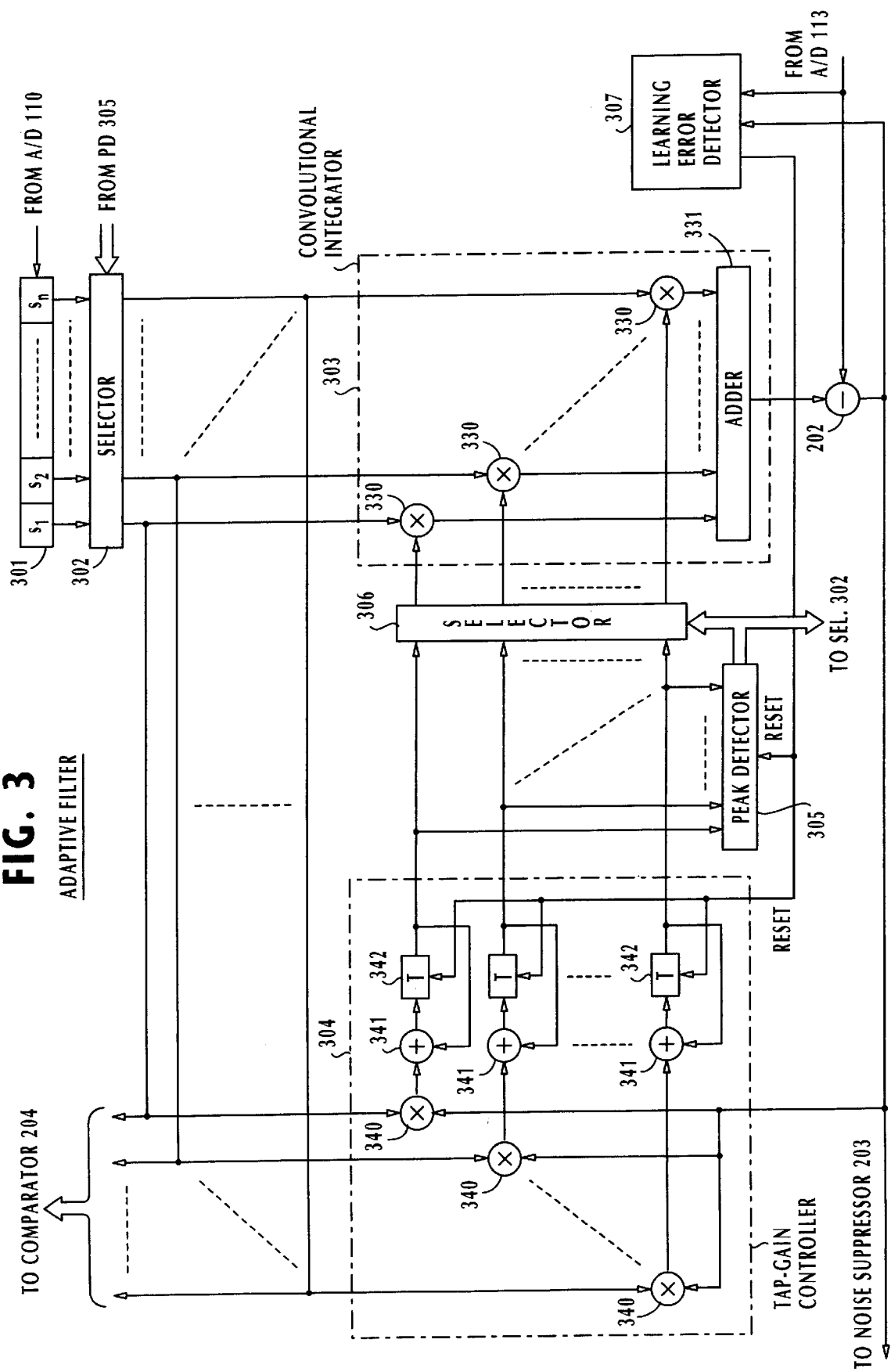
FIG. 3 is a block diagram of the adaptive filter of FIG. 2.

In FIG. 3, the adaptive filter 201 includes an input buffer 301, which receives digital speech samples from the A/D converter 110. This input buffer serves as a tapped delay line for providing a series of successively delayed digital speech samples $s_1$ through $s_n$ to a selector 302. Selector 302 is controlled by a peak detector 305 to select specified digital samples during the time a peak impulse response of the acoustic feedback path is detected by the peak detector. At other times, all digital samples of the input buffer 301 are selected and appear at the outputs of the selector 302. The outputs of the selector 302 are coupled to a convolutional integrator 303 where they are respectively weighted by tap-gain multipliers 330 by tap-gain (filter) coefficients and summed together in an adder 331, producing an echo replica.

The echo replica of the adaptive filter is combined in the subtractor 202 with the output of A/D converter 113 and the resulting residual echo is applied to the noise suppressor 203 and further to a tap-gain controller 304.

As one example, the tap gain controller 304 uses the LMS (least mean square) algorithm in which the stepsize $\mu$ is set equal to 1. In the tap-gain controller 304, correlations between the residual echo and the tap signals from the selector 302 are detected by correlators 340. The outputs of the correlators 340 are summed by adders 341 with previous filter coefficients stored in delay elements 342 to produce new filter coefficients, which are then stored into the delay elements 342, updating the previous filter coefficients.

The updated filter coefficients are supplied from the tap-gain controller to the multipliers 330 of the convolutional integrator via a selector 306. The updated filter coefficients are further coupled to the peak detector 305. Peak detector 305 makes a search through the filter coefficients for a peak value of the impulse response of the acoustic feedback path. Selector 306 is controlled by the peak detector 305 to select filter coefficients specified by the peak detector when it detects the peak impulse response of the acoustic feedback path. At other times, the delay elements 342 and the peak detector 305 are reset.

Those input speech samples selected by the selector 302 and those filter coefficients selected by the selector 306 occur in the neighborhood of its peak level of the impulse response of the adaptive filter.

During the initial period of operation, the delay elements 342 and the peak detector 305 are reset to an initial state and the inputs of selectors 302 and 306 appear at their outputs. A learning process then begins to allow the tap-gain controller 304 to converge its filter coefficients.

In order to detect an error developed in the learning (convergence) process, a learning error detector 307 is provided to monitor the local speech signal from the A/D converter 113 and the residual echo from the subtractor 202 to detect when the difference between these signals exceeds some critical value. When the critical value is exceeded, the learning error detector 307 recognizes that the learning process has failed and supplies a reset signal to the delay elements 342 and the peak detector 305 to allow them to restart the convergence process.

The second echo canceling signal of the comparator 204 is derived from the outputs of the selector 302 for comparison with the noise suppressed residual echo.

Figure 4:
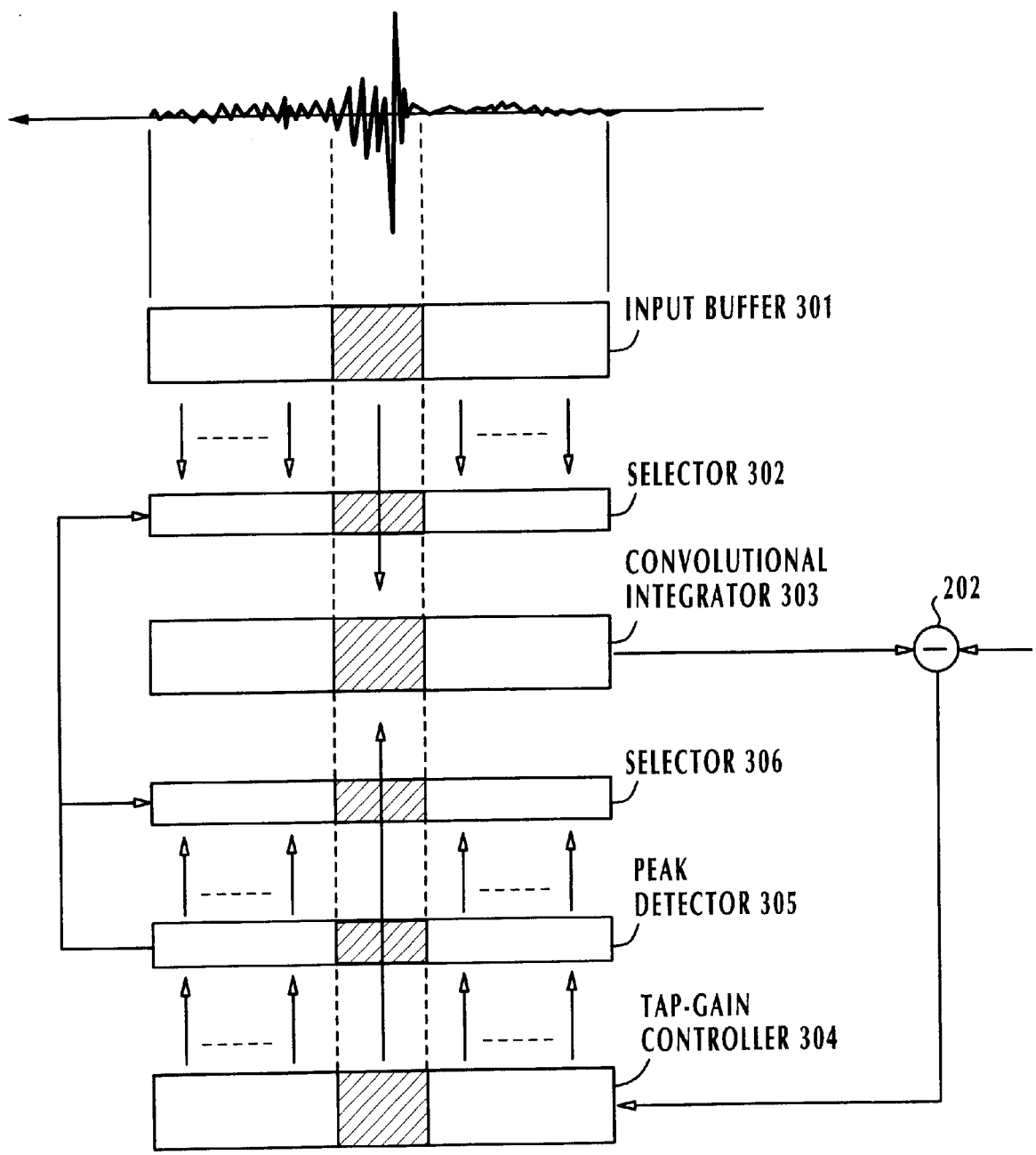
FIG. 4 is a schematic block diagram illustrating the relationships among the various signals of the adaptive filter of FIG. 3 when the peak level of the impulse response of the acoustic feedback path is detected.

As schematically illustrated in FIG. 4, when the learning process proceeds, only those digital speech samples of the input buffer 301 that correspond to the peak impulse response of the adaptive filter are selected by selector 302 and only those filter coefficients of the tap-gain controller 304 that correspond to that peak impulse response are selected by selector 306. Convolutional integration of these selected speech samples and filter coefficients by convolutional integrator 303 results in the generation of a signal which is applied to the subtractor 202 as an echo replica. Since the peak impulse response of the acoustic feedback path corresponds to a portion of the speech samples that contributes to the generation of the acoustic echo, the echo cancellation effect is significantly improved and the amount of computations can be significantly reduced.

While mention has been made of an adaptive filter using the LMS algorithm, other control algorithms could equally be as well used in the present invention.

What is claimed is:

1. An acoustic echo canceler for a speech communication system including a loudspeaker and a microphone acoustically coupled with the loudspeaker through a feedback path, comprising:

an adaptive filter including a tapped delay line for receiving a remote speech signal to produce a sequence of successively delayed tap signals and a convolutional integrator for respectively weighting the tap signals with filter coefficients and summing the weighted tap signals to produce an acoustic echo replica of said remote speech signal, and updating said filter coefficients with a residual echo;

said adaptive filter further including a detector for detecting a peak impulse response of said feedback path corresponding to an echo component of said remote speech signal, a first selector for restricting the filter coefficients to those which correspond to said echo component and a second selector for restricting the tap signals to those which correspond to the restricted filter coefficients;

a subtractor for combining an output signal of the microphone with said acoustic echo replica to produce said residual echo;

an attenuator for receiving an output signal of said subtractor; and comparator circuitry for comparing the output signal of the subtractor with the restricted tap signals of the adaptive filter, increasing the attenuation of the attenuator when the restricted tap signals are greater in magnitude than the output signal of the subtractor, and decreasing said attenuation when the restricted tap signals are smaller in magnitude than the output signal of the subtractor.

2. An acoustic echo canceler as claimed in claim 1, further comprising an error detector for detecting a difference between the output signal of said microphone and said residual echo and initializing the filter coefficients of the adaptive filter according to said difference.

3. An acoustic echo canceler for a speech communication system including a loudspeaker and a microphone acoustically coupled with the loudspeaker through a feedback path, comprising:

an adaptive filter including a tapped delay line for receiving a remote speech signal to produce a sequence of successively delayed tap signals and a convolutional integrator for respectively weighting the tap signals with filter coefficients and summing the weighted tap signals to produce an acoustic echo replica of said remote speech signal, and updating said filter coefficients with a residual echo;

said adaptive filter further including a detector for detecting a peak impulse response of said feedback path corresponding to an echo component of said remote speech signal, a first selector for restricting the filter coefficients to those which correspond to said echo component and a second selector for restricting the tap signals to those which correspond to the restricted filter coefficients;

a subtractor for combining an output signal of the microphone with said acoustic echo replica to produce said residual echo;

a first attenuator for suppressing small amplitude components of the residual echo;

a second attenuator for receiving an output signal from the first attenuator; and comparator circuitry for comparing an output signal of said first attenuator with restricted tap signals of the adaptive filter, increasing the attenuation of the second attenuator when the restricted tap signals are greater in magnitude than the output signal of the first attenuator, and decreasing the attenuation of the second attenuator when the restricted tap signals are smaller in magnitude than the output signal of the first attenuator.

4. An acoustic echo canceler as claimed in claim 3, further comprising an error detector for detecting a difference between the output signal of said microphone and said residual echo and initializing the filter coefficients of the adaptive filter according to said difference.

5. A method of canceling an acoustic echo of a telephone circuit comprising a hybrid circuit connected between a two-wire section of the telephone circuit and a four-wire section of the telephone circuit, the four-wire section including a receive circuit connected to a loudspeaker and a transmit circuit including a series of a subtractor and an attenuator connected to a microphone, said acoustic echo being produced as a result of acoustic coupling between said loudspeaker and said microphone through a feedback path, the method comprising the steps of:

a) receiving a remote speech signal from said receive circuit and producing a sequence of successively delayed signals;

b) convolutionally integrating the delayed signals with filter coefficients to produce an acoustic echo replica of said remote speech signal;

c) detecting a peak impulse response of said feedback path corresponding to an echo component of said remote speech signal, restricting said filter coefficients to those which correspond to said echo component and restricting the delayed signals to those which correspond to the restricted filter coefficients;

d) combining an output signal of the microphone with said acoustic echo replica in said subtractor to produce a residual echo;

e) updating said filter coefficients with said residual echo; and f) comparing the output signal of the subcontractor with the restricted tap signals, increasing the attenuation of the attenuator when the restricted tap signals are greater in magnitude than the output signal of the subcontractor, and decreasing said attenuation when the restricted tap signals are smaller in magnitude than the output signal of the subcontractor.

6. A method of canceling an acoustic echo of a telephone circuit comprising a hybrid circuit connected between a two-wire section of the telephone circuit and a four-wire section of the telephone circuit, the four-wire section including a receive circuit connected to a loudspeaker and a transmit circuit including a series of a subtractor, a first attenuator and a second attenuator connected to a microphone, said acoustic echo being produced as a result of acoustic coupling between said loudspeaker and said microphone through a feedback path, the method comprising the steps of:

a) receiving a remote speech signal from said receive circuit and producing a sequence of successively delayed signals;

b) convolutionally integrating the delayed signals with filter coefficients to produce an acoustic echo replica of said remote speech signal;

c) detecting a peak impulse response of said feedback path corresponding to an echo component of said remote speech signal, restricting said filter coefficients to those which correspond to said echo component and restricting the delayed signals to those which correspond to the restricted filter coefficients;

d) combining an output signal of the microphone with said acoustic echo replica in said subtractor to produce a residual echo;

e) updating said filter coefficients with said residual echo;

f) suppressing small amplitude components of the residual echo with said first attenuator; and g) comparing an output signal of said first attenuator with the restricted tap signals, increasing the attenuation of the second attenuator when the restricted tap signals are greater in magnitude than the output signal of the first attenuator, and decreasing the attenuation of the second attenuator when the restricted tap signals are smaller in magnitude than the output signal of the first attenuator.

* * * * *